Figure 1:
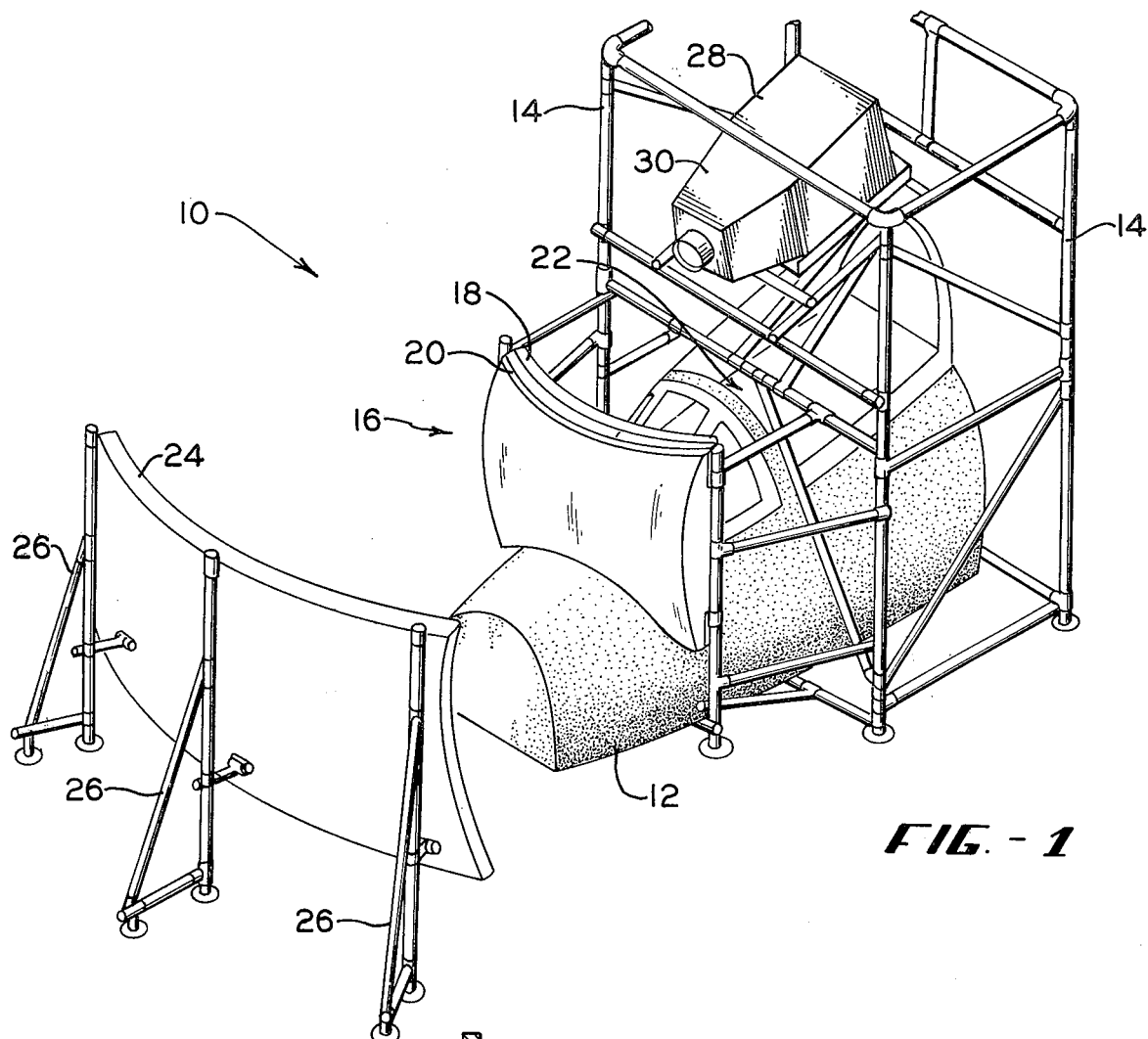

United States Patent [19]
Bartucci

[11] 3,909,523
[45] Sept. 30, 1975

[54] CRT PROJECTION LENS
[75] Inventor: John F. Bartucci, Akron, Ohio
[73] Assignee: Goodyear Aerospace Corporation, Akron, Ohio
[22] Filed: Apr. 8, 1974
[21] Appl. No.: 458,734

[52] U.S. Cl. ............... 178/7.8; 178/7.88; 178/7.89; 178/7.92; 178/DIG. 35; 35/10.2; 178/6.8
[51] Int. Cl.² ................G02B 17/00; G02B 27/10; G03B 21/56
[58] Field of Search... 178/7.88, 7.89, 7.92, DIG. 35, 178/6.8; 35/102; 358/60, 64, 66; 350/181

[56] References Cited
UNITED STATES PATENTS
3,784,742   1/1974   Burnham et al. ................. 178/7.88
3,800,085   3/1974   Ambats et al. ..................... 178/7.91

*Primary Examiner*—Benedict V. Safourek
*Assistant Examiner*—Edward L. Coles
*Attorney, Agent, or Firm*—Oldham & Oldham

[57] ABSTRACT

An optical simulator is presented which is capable of compensating for the dispersions and aberations inherently present in an acrylic collimating lens so as to present to the eye of a viewer a virtual image of high quality color characteristics. A CRT projection system is combined with a unique lens arrangement to reflect the image off of a spherical screen and through a collimating lens to the eyes of the viewer. While the screen and collimating lens designs are somewhat standard, the projection lens is specifically designed to correct for the deficiencies of the two aforementioned elements.

9 Claims, 2 Drawing Figures

U.S. Patent     Sept. 30, 1975     3,909,523

CRT PROJECTION LENS

BACKGROUND OF THE INVENTION

Heretofore it has been found that in visual simulators utilized for vehicle operator training, it is desirable and sometimes necessary to generate a color, high-resolution, real-world scene for trainee viewing. One of the more satisfactory techniques used in visual simulators employs a scale model of the desired scene or area over which an optical-probe/television-camera system is positioned automatically in response to simulated vehicle maneuvers. Such a special optical probe images the real world scene onto a T.V. camera pickup tube which converts it into an electrical signal, amplifies, processes and relays the same to a display for the student (generally through some type of optical system). Systems of this nature have been developed employing industrial high-resolution black-and-white television equipment (1,029 lines per frame and 30 mhz video bandwidth) as the image relay link. Further, color TV equipment, based on commercial broadcast standards, has been utilized in this type of visual system. While the former provides the highest resolution obtainable, the latter trades-off resolution and equipment complexity to attain color. There consequently remains a need for the provision of high resolution in color in a visual system as discussed above.

Consequently, it is an object of the instant invention to present a CRT projection lens operative to project a color display therethrough with improved resolution while minimizing system complexity and cost.

A further object of the invention is to present a CRT projection lens which compensates for the natural and inherent problems of color dispersion and aberations due to the structural characteristics of the collimating lens and screen utilized in many trainer devices.

These objects and other objects which will become apparent as the detailed description proceeds are achieved by a simulator system for projecting a color image to the eye of a viewer which provides for an amplified aperture at the eye of the viewer while maintaining color integrity of the image, comprising image projecting means for projecting an optical image; a screen positioned opposite said projecting means for receiving said optical image; a collimating lens positioned between said screen and a trainee viewing station for presenting a collimated image thereto and amplifying the characteristic aperture of the projecting means; and a lens system interposed between said projecting system and said screen and compensating for inherent light dispersion characteristics of the collimating lens.

Figure 2:
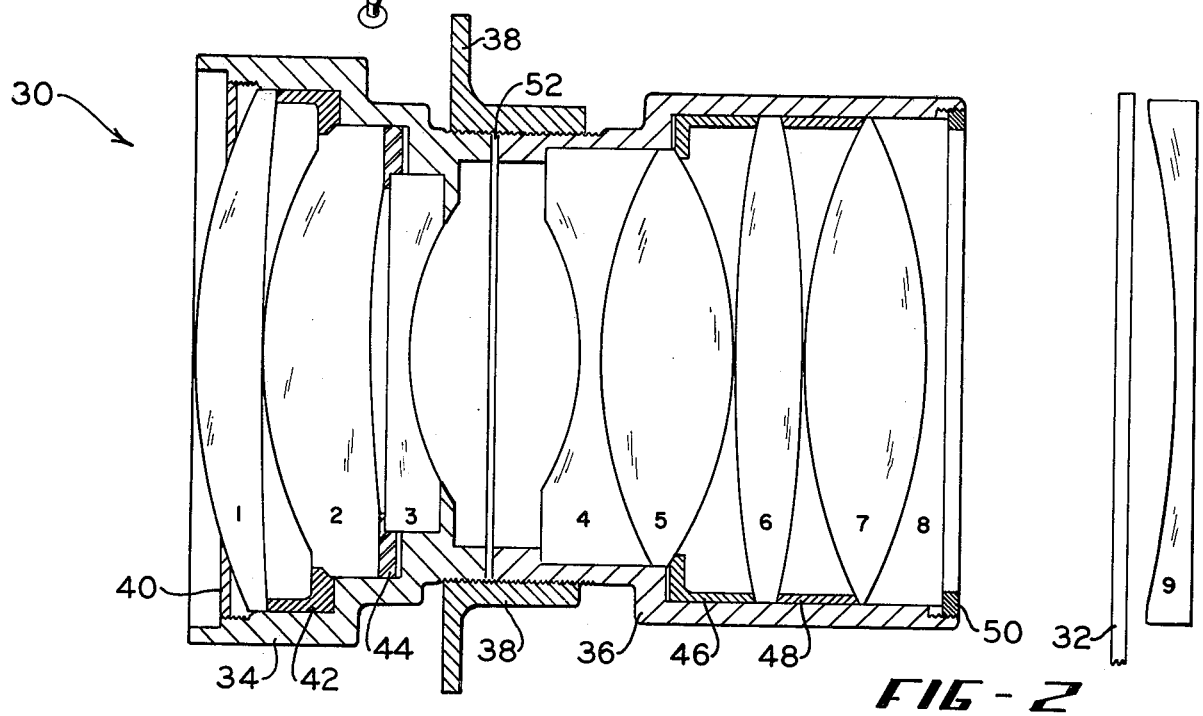

For a complete understanding of the structure and techniques of the invention reference should be had to the following detailed description and accompanying drawing wherein:

FIG. 1 is a pictorial view of the fundamental system structure of the invention; and FIG. 2 is a detailed cross-sectional view of the CRT projection lens of the system.

Referring now to the drawing and more particularly FIG. 1, it can be seen that the fundamental structure of the optical trainer of the invention is designated generally by the numeral 10. The system 10 includes a nose structure 12 which correlates with the nose of an aircraft. Tubular framework 14 is constructed about the nose 12 and makes securing engagement with a collimating lens 16 positioned in fixed relationship above the nose 12 as shown. As will be discussed in detail hereinafter, the collimating lens 16 comprises a double convex rear element 18 and a plano convex front element 20. The lens 16 is positioned forward of a general cockpit area 22 wherein the trainee sits during the training operation.

In alignment with the cockpit 22 and lens 16 is a spherical screen 24 maintained in fixed position by means of the supports 26. Operatively positioned above the cockpit 22 and maintained in an angle of declination toward the screen 24 is a CRT projection system 28 coupled with a unique CRT projection lens 30.

In operation, the trainee sits within the cockpit 22 and views, through the collimating lens 16, an image cast upon the screen 24 by means of the projection system 28, 30. As is common in the art, the collimating lens 16 is provided to create a real world visual perception to the eyes of the trainee. His eyes, rather than being focused at the physical screen which is at a distance of preferably eight feet away, are focused at infinity since he is presented with the projected scene as if he were in a landing aircraft. The lens combination 16 is positioned such that the screen is at the focal length resulting in collimation of the existing scene. The eyes are relaxed and unconverged when viewing the collimated scene as in real life so as to enhance the simulation.

The lens 16 preferably consists of two acrylic components placed approximately two feet in front of the trainee's head position and at the equivalent focal length from the screen, this focal length being approximately eighty four inches. The field of view of the lens is approximately 45° × 60° and the lens 16 preferably has corresponding dimensions of 50 inches by 36 inches.

The double convex element 18 of the lens assembly 16 comprises a single piece of acrylic while the plano-convex front element 20 comprises a laminate of two 4-inch thick pieces of acrylic. Because the index of refraction of the applicable acrylic is limited to nominally 1.489, complete distortion and color aberation correction is not possible in the lens design. In the design of the preferred embodiment presented herein, attainable corrections were made using the three wave lengths of C(red hydrogen line 656.27nm), D(yellow helium line 587.56nm), and F(blue hydrogen line 486.13nm) as design points. Distortion was balanced against the desired collimation of plus or minus 5 arc minutes across the field. The residual lateral color dispersion of 4 arc-minutes was partially corrected by over correcting the color in the CRT projection lens to be discussed hereinbelow. The projection lens an infinitization lens were designed as a unit for this purpose. It is the imperfections and distortions inherently characteristic of the acrylic collimation lens which requires the careful design of the lens system 30. By taking into account the particular perameters of the collimating lens 16, the projection lens 30 may be designed to correct therefor.

An exit pupil on the collimating lens, which is the image of the CRT projection lens iris, is approximately twelve inches in diameter and provides the "audience area" where the trainee's eyes are centered. Within this diameter, the screen will be fully illuminated for both eyes, allowing reasonable lateral head movement.

The screen 24 is preferably a 6 by 8 foot spherical section of 10 foot radius providing a field of view of plus 15° minus 25° vertically and plus or minus 30° horizontally. It is lightweight and consists of a reflective surface, a one half inch high-density epoxy substrate and a rigidity enhancing layer of 4 inches of low density foam.

The preferred screen is made by stretching a bonded sandwich of 0.001 inch aluminized mylar and a 0.004 inch embossed vinyl over a swept epoxy male mold. The low density epoxy foam layer is added for rigidity. The final width is achieved by bonding together three segments each being 40 inches wide.

The resultant screen reflectivity is semi-specular; that is, it is brighter than a flat white screen but not as shiny as a mirror. Screen gain is determined by comparison with a diffused Lambertain screen which is assigned a gain of 1X. The screen appears to have the same bright characteristics regardless of the angle from which it is viewed. Since the cathode-ray tube brightness provides a very low screen brightness, such as 0.05 to 0.10 foot candles, a semi-specular screen is desirable because of the brighter scene presented. A gain of 90× to 110× was chosen to provide a screen brightness level of approximately 10 foot candles. The degree of embossing of the 0.004 inch embossed vinyl layer determines the ultimate screen gain and hence this consideration must be made when selecting this layer so as to achieve the desired reflectivity characteristics.

As is well known, as the gain of the screen increases, the directionality becomes narrower. For a screen of approximately 100× gain, the brightness lobe is approximately 5°. Because of this, the screen 24 must be curved so that the screen brightness lobes for the entire surface are directed towards the cockpit area 22 for total screen illumination as seen by the viewer.

The cathode ray tube projection lens 30 was specifically designed for the simulator shown in FIG. 1. Preferably, the focal length of this lens 30, which is shown in cross section in FIG. 2, is 5.25 inches and has an F-number of 1.5. The field of view is 45° × 60°. The specific elements of the lens assembly 30 are shown in FIG. 2 and respectively numbered by the numerals 1-8. One of the single elements of the lens assembly 30 is the weak negative field flattener 9 which is mounted adjacent to the CRT face and separated from the remaining eight lens elements of the system by means of the filter wheel 32 which operates in the conventional manner.

The fundamental eight lens elements are housed within a front lens cell mount 34 and a rear lens cell housing 36, the two of which are threadably interconnected by means of the flanged lens mount 38. The cell is separable at this point of interconnection so that aperture plates of differing F number values may be inserted therein at 52. Course focusing of the lens is accomplished by adjusting the two cell halves 34,36 in the threaded flange 38 while fine adjustment is achieved by moving the cathode ray tube 28.

It should be readily appreciated by those skilled in the art from a view of FIG. 2 that a ring lens clamp 40 is positioned at the front end of the front lens cell mount 34 for retaining the various lens elements therewithin. Further, numerous lens spacers are positioned between the lens elements to achieve the desired optical results. A spacer 42 separates elements 1 and 2 while the spacer 44 is interposed between the elements 2 and 3. Similarly, elements 5 and 6 are separated by the spacer 46 while elements 6 and 7 are positionally maintained by means of the spacer 48. As is readily apparent, the lens elements 4 and 5 have no spacer therebetween and neither do the elements 7 and 8. These two respective pairs of lens elements comprise doublets or achromats which are double lenses cemented together in the normal fashion. Of course, appropriate cement must be utilized for purposes of creation of the doublets or achromats to achieve the desired optical results.

While certain of the dimensional characteristics of the lens assembly 30 are presented in the illustration of FIG. 2, for purposes of clarity and specificity with regards to the preferred embodiment of the invention, the following chart is presented to illustrate the desired design criteria for the preferred embodiment. The concave and convex radii of the various lens elements are specifically related in this chart as are the preferred glass types. It should of course be noted that the element 4 has two concave surfaces while the elements 5, 6 and 7 have two convex elements. The specific dimensions of the various surfaces of the double concave or double convex elements are believed to be apparent from the drawing and more particularly from the fact that elements 4 and 5 and 7 and 8 comprise respective doublets and hence the concave and convex radii thereof are equivalent.

| LENS ELEMENT | RADII | | GLASS TYPE |
|---|---|---|---|
| | CONVEX (Inches) | CONCAVE (Inches) | |
| 1 | 7.022 | 27.575 | SF-56 |
| 2 | 4.417 | 11.903 | SK-8 |
| 3 | 149.15 | 2.965 | F-8 |
| | | 2.965 | |
| 4 | | 4.417 | SF-8 |
| | 4.417 | | |
| 5 | | | LAK N14* |
| | 4.207 | | |
| | 14.567 | | |
| 6 | | | LAK N14 |
| | 14.567 | | |
| | 5.157 | | |
| 7 | | | LAK N14* |
| | 5.157 | | |
| 8 | 92.950 | 5.157 | BK-7* |
| 9 | PLANO | 9.005 | BK-7 |

*Preferred Grade 3 restricted Nd glass

As was mentioned hereinabove, the lateral colored correction is modified so that the residual uncorrected lateral color introduced by the collimating lens is compensated for in the projection lens design. This design is that presented in FIG. 2 and illustrated by means of the chart presented hereinabove. By utilization of this lens, it was found that the blue to yellow dispersion was fully corrected and the blue to red dispersion was reduced to 25% of its uncorrected value. To aid in achieving this dispersion correction and reduction, all air surfaces in the lens assembly are single coated with anti-reflection magnesium fluoride peaked at 5,500 A.

As was further mentioned hereinabove, the screen 24 is tilted backward at a preferable angle of 9° to reflect the illumination lobe towards the trainee's head position within the cockpit 22. To maintain the projection lens focus over the entire screen, the CRT face is tilted 0.5° in relation to the lens axis.

By virtue of the system and specific structure presented hereinabove, the described assembly is operative to compensate for the inherent dispersion and aberation characteristics of the collimating lens 16 and screen 24 so as to present to the eyes of the trainee a real image which maintains color integrity and preciseness. While in accordance with the patent statutes only the best mode and preferred embodiment of the invention have been presentd and described in detail, it is to be understood that the invention is not limited thereto or thereby. Consequently, for an appreciation of the scope and breadth of the invention reference should be had to the appended claims.

What is claimed is:

1. A simulator system for projecting a color image to the eye of a viewer which provides for an enlarged aperture at the eye of the viewer while maintaining color integrity of the image, comprising:
   image projecting means for projecting an optical image;
   a screen positioned opposite said projecting means for receiving said optical image;
   a collimating lens positioned between said screen and a trainee viewing station for presenting a collimated image thereto; and
   a lens system interposed between said projecting system and said screen and compensating for inherent light dispersion characteristics of the collimating lens.

2. The simulator system as recited in claim 1 wherein said image projecting means comprises a CRT.

3. The simulator system as recited in claim 1 wherein said screen comprises a spherical section of a bonded sandwich of aluminized mylar and embossed vinyl.

4. The simulator system as recited in claim 3 wherein said screen is semi-specular.

5. The simulator system as recited in claim 1 wherein said collimating lens comprises a double convex element in spaced relationship with a plano convex element, said elements being of an acrylic material.

6. The simulator as recited in claim 1 wherein said image projecting means is a CRT and said lens system includes a field flattener lens mounted adjacent the CRT face for projecting the image onto a curved screen surface.

7. The simulator as recited in claim 1 wherein said lens system comprises a plurality of single lens elements and cemented achromats mounted within a threadably connected and adjustable housing, the lens elements and achromats compensating for the color dispersion of the collimating lens to fully correct the blue to yellow dispersion and reduce the blue to red dispersion by about 25%.

8. The simulator as recited in claim 7 wherein each of the lens elements and achromats are single coated with anti-reflection magnesium fluoride peaked at 5,500 'A'.

9. An optical image simulator, comprising:
   an image projecting means;
   a semi-specular screen comprising a spherical section positioned opposite said projecting means to receive image projections therefrom;
   a collimating lens interposed between the screen and a viewer's station for collimating the image viewed from the screen; and
   a lens system comprising a plurality of single lens elements and achromats contained within a threadably adjustable housing to compensate for the inherent light dispersion characteristics of the collimating lens and including a field flattener mounted adjacent said image projecting means for projecting an image onto the spherical screen.

* * * * *